(12) United States Patent
Guidotti et al.

(10) Patent No.: US 10,146,922 B2
(45) Date of Patent: Dec. 4, 2018

(54) ACCESS CONTROL OF SOFTWARE APPLICATIONS BASED ON BIOMETRIC IDENTIFIERS

(71) Applicant: International Business Machines Corporation, Armonk, NY (US)

(72) Inventors: Alice Guidotti, Rome (IT); Bernardo Pastorelli, L'Aquila (IT); Leonardo Rosati, Rome (IT); Elia Tufarolo, Lido di Tarquinia (IT)

(73) Assignee: INERNATIONAL BUSINESS MACHINES CORPORATION, Armonk, NY (US)

(*) Notice: Subject to any disclaimer, the term of this patent is extended or adjusted under 35 U.S.C. 154(b) by 10 days.

(21) Appl. No.: 15/382,282

(22) Filed: Dec. 16, 2016

(65) Prior Publication Data

US 2018/0173861 A1   Jun. 21, 2018

(51) Int. Cl.
    G06F 21/32     (2013.01)
    G06F 21/45     (2013.01)

(52) U.S. Cl.
    CPC ............ *G06F 21/32* (2013.01); *G06F 21/45* (2013.01)

(58) Field of Classification Search
    CPC ...................................... G06F 21/32
    See application file for complete search history.

(56) References Cited

U.S. PATENT DOCUMENTS

| | | |
|---|---|---|
| 6,720,880 B2 | 4/2004 | Gutta et al. |
| 7,000,200 B1 | 2/2006 | Martins |
| 7,577,847 B2 * | 8/2009 | Nguyen ............ G06Q 20/3224 380/231 |
| 7,853,535 B2 | 12/2010 | Colella |
| 8,185,646 B2 * | 5/2012 | Headley ................. G06F 21/32 709/225 |
| 8,880,291 B2 | 11/2014 | Hampiholi |
| 8,966,590 B2 | 2/2015 | Janzer |

(Continued)

OTHER PUBLICATIONS

Adam Thierer, "Social Networking and Age Verification: Many Hard Questions; No Easy Solutions," The Progress & Freedom Foundation—Progress on Point; Release 14.5, Mar. 2007, pp. 1-33.

*Primary Examiner* — Kambiz Zand
*Assistant Examiner* — Thanh Le
(74) *Attorney, Agent, or Firm* — Leason Ellis LLP (57) ABSTRACT

In one implementation, the present invention is directed to a method for controlling access to a software application using one or more processors configured by code, the method comprising repeating a usage verification cycle continually during a usage session of the software application, wherein each repetition of the usage verification cycle includes receiving a digital image of an access area used to access the software application, identifying a representation of one or more persons in the digital image, estimating an age of each one of the persons within the digital image, and comparing the estimated age of each one of the persons within the digital image to a predetermined age value provided in a usage policy dataset associated with at least of one of the persons within the digital image. The method further comprises interrupting the usage of the software application in response to the age of at least one of the persons within the digital image exceeding the predetermined age value provided in a usage policy dataset.

20 Claims, 6 Drawing Sheets

(56) References Cited

U.S. PATENT DOCUMENTS

| | | | |
|---|---|---|---|
| 2003/0177102 A1* | 9/2003 | Robinson | G06Q 20/04 705/75 |
| 2008/0033941 A1 | 2/2008 | Parrish | |
| 2010/0251336 A1* | 9/2010 | Allen, Jr. | G06F 21/316 726/4 |
| 2011/0026835 A1* | 2/2011 | Ptucha | G06F 17/30247 382/209 |
| 2011/0209192 A1 | 8/2011 | LeClerc Greer et al. | |

* cited by examiner

ACCESS CONTROL OF SOFTWARE APPLICATIONS BASED ON BIOMETRIC IDENTIFIERS

BACKGROUND

The present disclosure relates to the control of access to software applications.

Software applications usage is common among large segments of the population. This is especially true over the Internet, wherein effectively everyone may access software applications that are hosted on server computers, such as by connecting remotely to them with their client computers.

However, some software applications may be inappropriate for a particular age group. For example, parents may wish to prevent children within certain age groups from using social networking services where it is possible to interact unsupervised with adults. Likewise, parents may wish to prevent children's access to age inappropriate content (such as photos, movies).

In the art there are software applications that have terms and conditions that grant access only to persons having specific ages. For this purpose, the age of the person is generally verified by a simple self-certification, which is performed when the person signs in to the software applications (e.g., by providing their date of birth). However, no guarantee exists that the age declared by the persons is true.

Several techniques are also known for verifying the actual age of the persons signing in to an application. For example, United States Patent Publication No. 2010/0251336 discloses a combination of audio tones with varying frequencies to identify an age range to which a user belongs and accordingly controls access to age dependent access controlled information and services.

U.S. Pat. No. 8,185,646 discloses the use of biometric templates (stored during the user enrollment process) to authenticate users logging into the social network to prevent user impersonation.

U.S. Pat. No. 7,853,535 discloses the technique of assigning each child a Safe Card with integral fingerprint scanner plus an intelligent USB card reader, which are used to access the Internet from any web-enabled computer simply by plugging the card reader into the computer's USB port, inserting the Safe Card, and scanning the fingerprint so as to pre-load parental control rule sets giving the child-user a restricted safe and secure, but full internet, experience.

United States Patent Publication No. 2008/0033941 discloses receiving biographical information pertaining to an unverified individual, authenticating that the biographical information is correct for the individual, assigning the individual a verified chat room username that is linked to the authenticated biographical information, and using the authenticated biographical information to selectively limit chat room activity for the username.

United States Patent Publication No. 2011/0209192 discloses registering users in a social network, wherein registering users includes storing in association with a user ID for each registered user at least one image and verifying the user during a subsequent login by comparing a current image with the stored image.

U.S. Pat. No. 8,966,590 discloses obtaining parental authorization from an additional user having a parental relationship to a user having an age less than a threshold age (a child user) that attempts to access an online service or perform actions using the online service, wherein the online service verifies the validity of the identified user's account, the age of the identified user, and/or a connection between the identified user and the child user having a parental relationship type. The online service may make these verifications based in part on social and transactional information associated with the identified user's account.

However, the techniques known in the art do not provide an effective control of the usage of the software applications, with particular reference to the age of the persons using them.

SUMMARY OF THE INVENTION

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In one implementation, the present invention is directed to a method for controlling access to a software application using one or more processors configured by code, the method comprises repeating a usage verification cycle continually during a usage session of the software application, wherein each repetition of the usage verification cycle includes receiving a digital image of an access area used to access the software application, identifying a representation of one or more persons in the digital image, estimating an age of each one of the persons within the digital image, and comparing the estimated age of each one of the persons within the digital image to a predetermined age value provided in a usage policy dataset associated with at least of one of the persons within the digital image. The method further comprises interrupting the usage of the software application in response to the age of at least one of the persons within the digital image exceeding the predetermined age value provided in a usage policy dataset.

In a further implementation, the present invention is directed to a system for controlling access to a software application, wherein the system comprises a processor configured with code to repeat a usage verification cycle continually during a usage session of the software application. The processor is further configured to receive a digital image of an access area used to access the software application in each repetition of the usage verification cycle. Furthermore, the processor is configured to identify a representation of one or more persons in the digital image in each repetition of the usage verification cycle and estimate an age of each one of the persons according to biometric information of the person extracted from the representation thereof in each repetition of the usage verification cycle. The processor is additionally configured to verify a usage policy based on the age of the persons in each repetition of the usage verification cycle, and interrupt the usage of the software application in response to a missing fulfillment of the usage policy in each repetition of the usage verification cycle.

BRIEF DESCRIPTION OF THE SEVERAL VIEWS OF THE DRAWINGS

The foregoing and other features of the present invention may be more readily understood from the following detailed description in conjunction with the appended drawings in which.

DETAILED DESCRIPTION OF EXEMPLARY EMBODIMENTS

With reference in particular to FIG. 1A-FIG. 1D, the general principles are shown for one implementation of the system and method of the present invention.

Figure 1A:
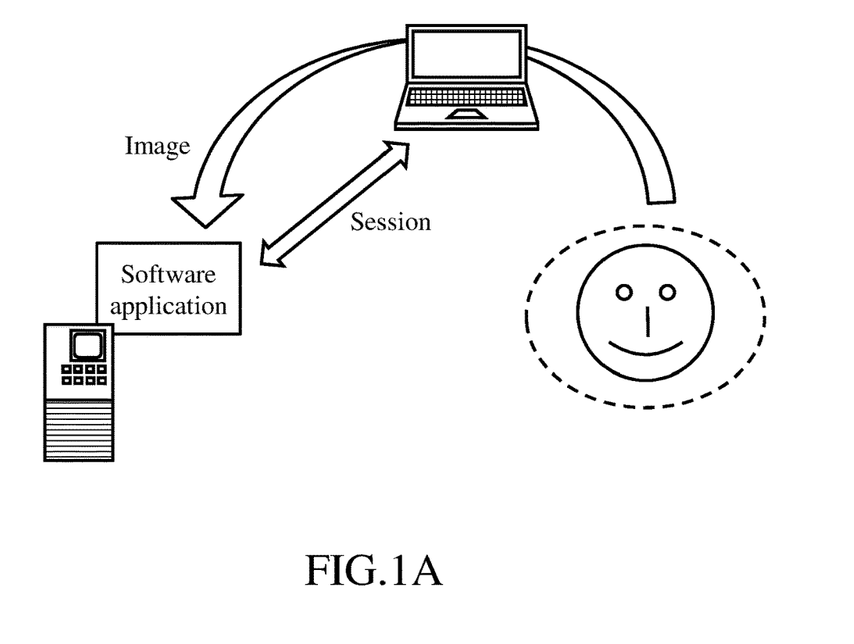
FIG. 1A-FIG. 1D are high level diagrams of a system according to a particular implementation of the present disclosure.

Starting from FIG. 1A, a user establishes a usage session with a software application (e.g., implementing a social network service) running on a corresponding computing machine, such as a server connected to the Internet. The user is free to use the full functionality of the software during the usage session. For instance, the user may exchange messages remotely with another user(s) using a messaging server.

According to one implementation of the system and method described, a usage verification cycle is repeated continuously during a software usage session. For example, the verification cycle is repeated every few minutes. In each repetition of the usage verification cycle, a digital image of an access area is received and used to access the software application. For example, an image of the client is captured by a web camera or other image recording device local to the user and sent to the server.

Figure 1B:
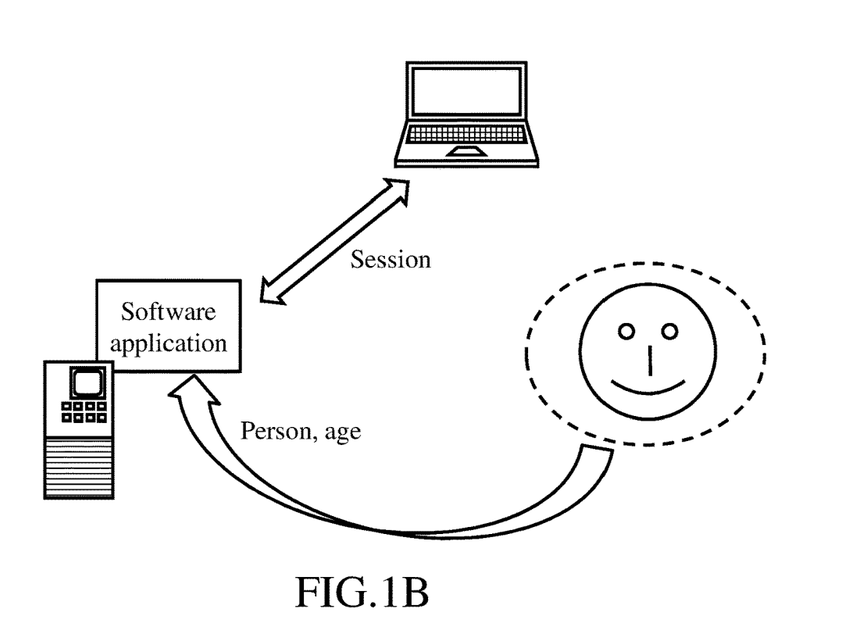

As shown in FIG. 1B, a representation of one or more persons is identified in the digital image. The age of each person (in the digital image) is then estimated according to biometric information of the person as contained in the image. In a particular implementation, the biometric information is extracted from the representation of one or more persons in the digital image.

Figure 1C:
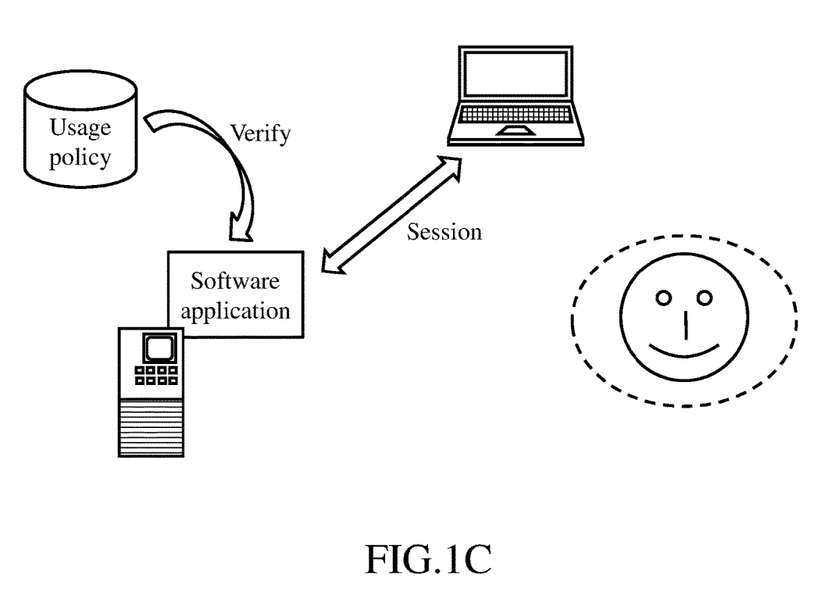

Moving to FIG. 1C, permitted usage of the software application is set by a usage policy. The age of the user is checked against the usage policy. For example, the usage policy may require that the age of every person using the software application should not exceed a maximum value. In a particular implementation, the maximum age value is set as the age of majority in a particular locale.

Figure 1D:
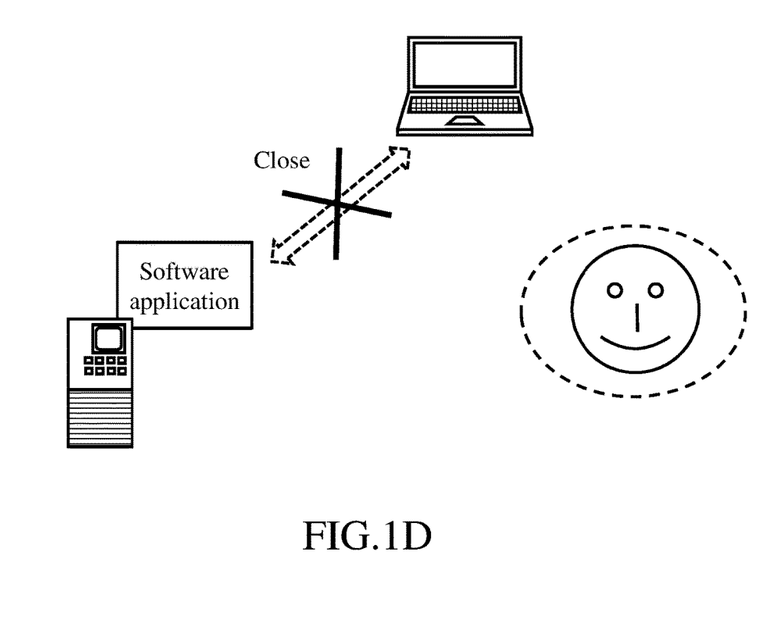

Moving to FIG. 1D, the usage of the software application is interrupted, such as by closing the usage session, when the usage policy is not fulfilled. For example, the software application is disrupted when the age of any person in the digital image exceeds the maximum value.

The age verification and usage policy thus provide an effective control of the usage of the software application.

Furthermore, the ages of the persons using the software application are verified continually while it is used. As a result, it is possible to verify at any time that only age appropriate persons are using the software application. Thus, the system described prevents or limits the use of age inappropriate software applications For example, the described system prevents children from interacting with adults using social network services or from accessing adult content.

Figure 2:
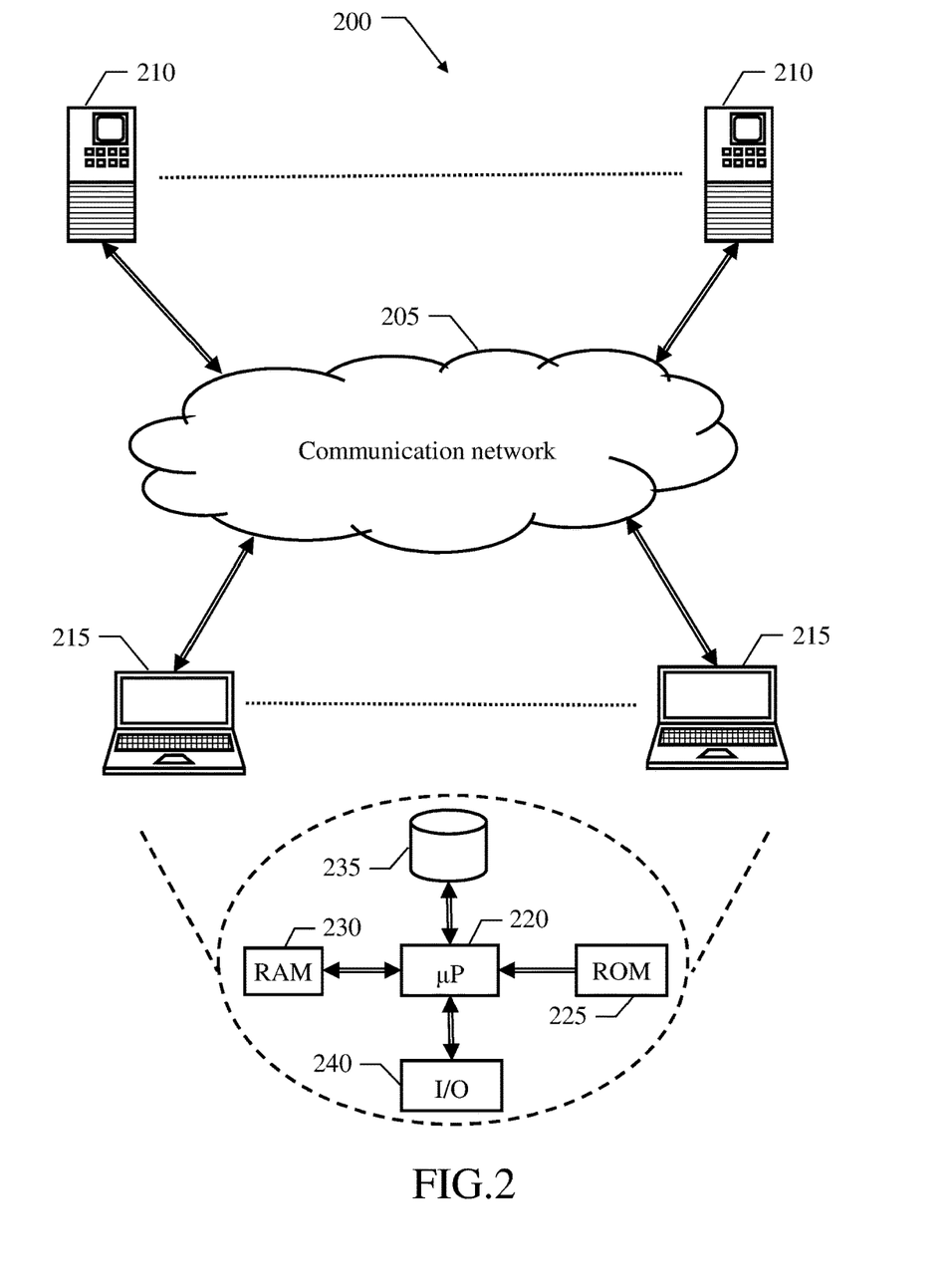
FIG. 2 is a schematic block diagram of a computing infrastructure in which a particular implementation of the present disclosure may be practiced.

With reference now to FIG. 2, a schematic block diagram is shown of a computing infrastructure 200 wherein the age verification functionality according to a particular embodiment of the present invention is implemented.

As shown, the computing infrastructure 200 is a distributed computing system based on a global communication network 205. In one particular implementation, the network 205 is the Internet.

The computing infrastructure includes one or more computer servers (herein servers), 210 connected to the communication network 205. For example, the servers 210 are implemented as one or more computing devices within one or more data centers connected to the communication network 205. The servers 210 run one or more software applications that may be accessed remotely via the communication network 205. In one particular implementation the one or more software applications includes a social network or communications services. Here, the social network services are used to share information among persons having similar interests, activities or connections. For example, the social network is used for maintaining contacts, building relations or exchanging information. Social network services can include chat rooms that permit persons to converse in real-time using instant messages.

Registered users of social network services may use them by connecting to the corresponding servers 210 with client computing devices, or simply clients, 215 (e.g. laptops, tablet computers, or smartphones). For example, the registered user posts and reads messages using a client 215 device.

Each computing machine of the computing infrastructure 200 (i.e., servers and clients) may comprise several interconnected hardware units. For example, the interconnected hardware elements communicate with one another through a communication bus and/or a cabling sub-system. In a particular implementation, the computing machines are arranged or connected in a communication architecture that is suitably scaled according to the actual function of the computing machines or network.

With particular detail, one or more microprocessors (µP) 220 of a computing device control operation of the computing machine. Such computing devices also include, in one implementation, a non-volatile memory (ROM) 225 that stores basic code for an initialization of the computing machine and a volatile memory (RAM) 230 is used as a working memory by the microprocessors 220. The computing machine is provided with a mass-memory 235 for storing programs and data. In one implementation, the mass memory devices are data storage devices, such as hard disks, of data centers, servers and clients). The computing machine may include peripheral (or Input/Output, I/O) units 240. For example, the peripheral units 240 of the servers include a network interface card (NIC) for connecting to the communication network 205 (through a router sub-system of the data centers) and a drive for reading/writing removable storage units (like DVDs) implemented by a console of the data centers. With respect to the client the peripheral units 240 may include a Wireless Network Interface Card (WNIC), such as a Wi-Fi network interface for connecting to access points to the communication network 205 (not shown in the figure). The peripheral units 204 further include hardware interfaces for connecting the microprocessor to a monitor so as to display information, a web-camera for acquiring digital images/videos in front of the monitor, a keyboard and a touch pad for entering commands and text data.

Figure 3:
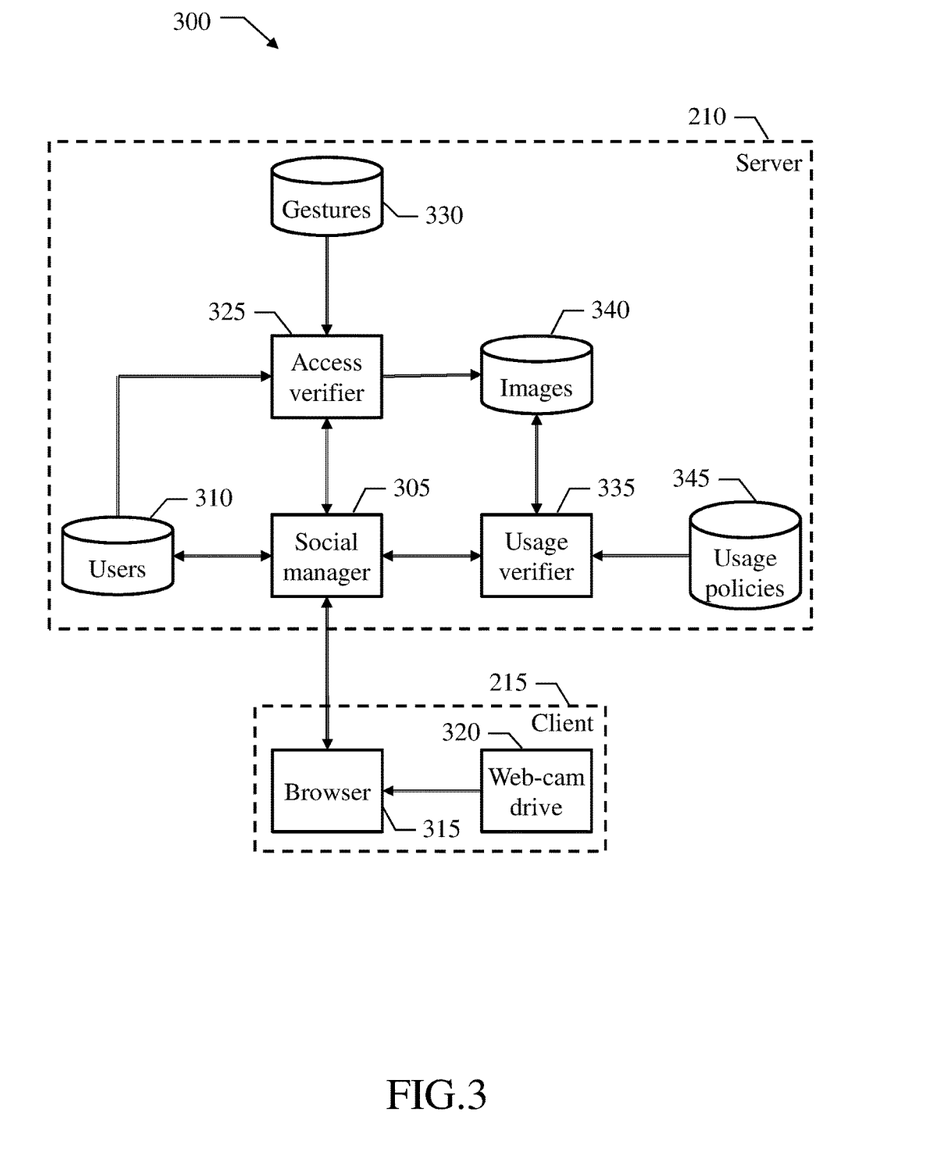
FIG. 3 illustrates a diagram of the main software components according to a particular implementation of the present disclosure, and FIG. 4A

With reference now to FIG. 3, one or more modules, such as implemented as code executed by the microprocessor, are used to implement the age verification functionality described.

Particularly, all the code modules (implemented as executable programs and data) are denoted as a whole with the reference 300. The code modules are typically stored in the mass memory and loaded (at least partially) into the working memory of each computing machine (servers and clients) when the modules are running, together with an operating system and other application programs (not shown). The code modules are initially installed into the mass memory, for example, from removable storage units or from the communication network. In this respect, each executable module may be a segment or portion of code, which comprises one or more executable instructions for causing the microprocessor to implement one or more specified logical functions.

In particular, each server 210 implementing a social network service (only one shown in the figure) runs a social manager module 305 that controls or coordinates the functions and services of the social network. For instance, the social manager module 305 controls and implements user registrations, access, and instant messages exchanges. The social manager 305 accesses (in read/write mode) a user repository 310, which stores information relating to each person registered as a user of the social network service. For example, the social media manager 305 stores a user identifier, password and personal data, like name, age, e-mail address, and telephone number.

The client 215 of each user of the social network service (only one shown in the figure) runs a web browser, or simply browser, 315 that is used to access network resources, such as to communicate over the Internet, and particularly to interact with the social manager 305 for using the social network service. The browser 315 exploits a web-cam drive 320, which controls the web-cam of the client 215.

In accordance with a particular aspect of the access control system described herein, the social manager 305 interacts with an access verifier module 325, which is used to verify any access to the social network service. The access verifier module 325 accesses (in read mode) the user repository 310. Moreover, the access verifier module 325 accesses (in read mode) a gesture repository module 330. The gesture repository module 330 stores a definition of a plurality of gestures (for example, 10-30 gestures). Here, each gesture such as clapping hands, smiling, blinking eyes, is defined by a description in text and/or graphical form. In a particular implementation, the description of the gesture is stored as a natural language phrase and/or one or more static/animated images. Furthermore, one or more rules for detecting the gesture in a digital video (according to standard image recognition techniques) is also associated with the gesture by the gesture repository module 330. Moreover, the gesture repository 330 stores an indication of an access policy to the social network service based on a verification of the gestures. For example, the access policy indicates a maximum number of acceptable failures of the verification of the gestures. The access verifier module 325 accesses (in write mode) an image repository 340 (implemented as a database or flat file storage repository), which stores a series of digital images for each usage session of the social network service that is currently in progress with a corresponding user. In a particular implementation, the digital images stored in the image repository 340 relate to a specific or specified usage area, which is used to access the social network service. For example the digital images stored in the repository 340 each depict a usage area in front of the client of the user.

The social manager module 305 further interacts with a usage verifier module 335, to verify the usage of the social network service. The usage verifier module 335 configures one or more microprocessors to access (in read/write mode) the image repository 340. Moreover, the usage verifier module 335 configures one or more microprocessors to access (in read mode) a usage policy repository 345, which stores a usage policy of the social network service. Such a usage policy may be based on the age of the persons using the social network service. For example, the usage policy provides a maximum value of the age that is acceptable for any person using the social network service. In an alternative configuration, the usage policy provides a range of acceptable ages for a particular function or application, such as permitting access to a chat room for users between 12-18 years. Moreover, the usage policy may comprise one or more usage rules contributing to defining when the usage policy is fulfilled or not. For example, a primary usage rule indicates that the usage policy is not fulfilled as soon the age of a person that is in front of the client exceeds the maximum value a single time and a secondary usage rule indicates that the usage policy is not fulfilled as soon the age of any person that may be behind the main person in the background exceeds the maximum value a selected number of times e.g. 2-4 times).

Figure 4A:
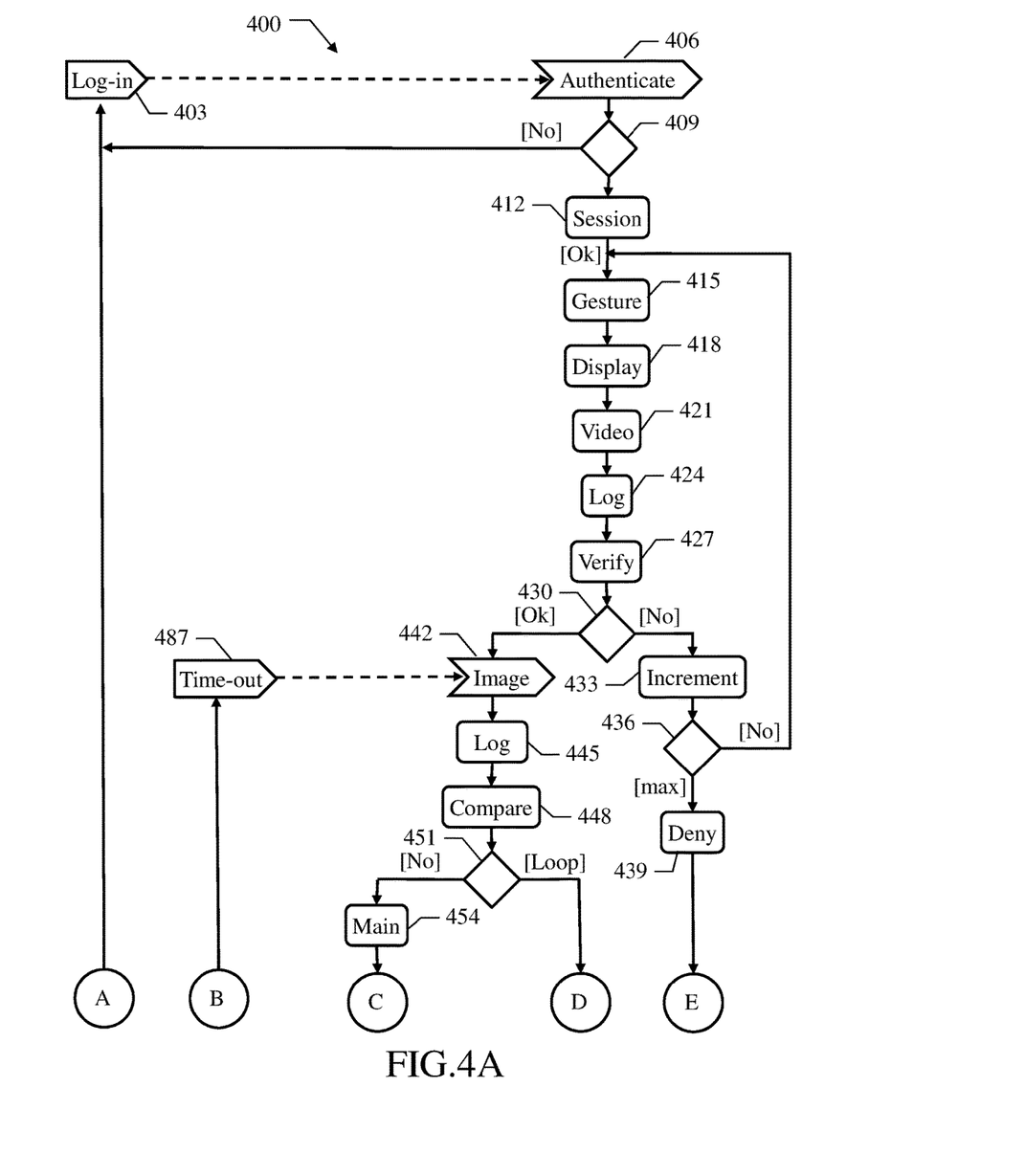
Figure 4B:
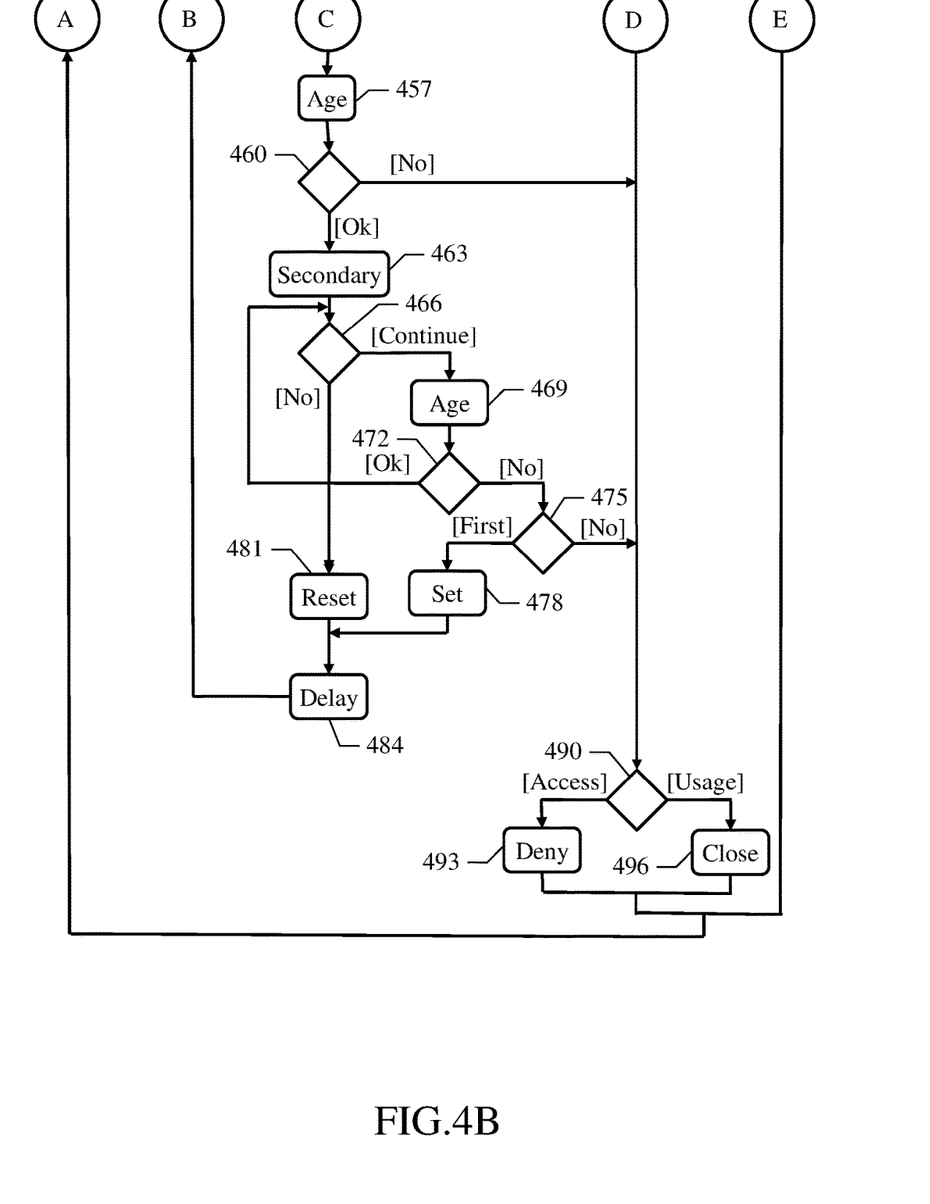
-FIG. 4B is an activity diagram describing the flow of activities relating to a particular implementation of the present disclosure.

With reference now to FIG. 4A-FIG. 4B, a flow diagram is provided detailing the steps carried out for implementing the access restriction system described herein.

FIG. 4A represents an exemplary process 400 used to control the usage of the social network service. In this respect, each block may correspond to one or more executable instructions for implementing the specified logical function on the relevant computing machines.

The process passes from block 403 to block 406 as soon the social manager receives a request for access (log-in) to the social network service (submitted by any person via the browser of his/her client). At this point, the access verifier configures one or more microprocessors to attempt to authenticate the person requesting the access. For example, the microprocessor attempts the authenticate the person by sending a message to the client device, which causes the browser to prompt the person requesting access to enter his/her user identifier and password, and to transmit them to the server. The flow of activity branches at block 409 according to a result of this operation. Particularly, if the person has not been authenticated, such as because the user identifier is not recognized and/or the password is not correct, the access verifier module configures one or more microprocessors to refuse access to the social network service. Upon a refusal of access, the one or more microprocessors awaits a next request of access as shown in block 403.

With reference again to block 409, where the user has been correctly authenticated (such as a user of the social network service) the process descends into block 412. Here, the social manager module configures one or more microprocessors to establish a usage session of the social network service for the user by allocating a session handler used to store context information thereof (but without granting the access to the social network service. A loop implementing an access verification cycle is then entered by descending into block 415, wherein the access verification module configures one or more microprocessors to select one of the gestures (such as from the gesture repository) in a pseudo-random manner. For example, the access verification module configures the microprocessor to select one of the gestures using a pseudo-random number generator (PRNG).

Continuing to block 418, the access verifier configures one or more microprocessors to send a message to the client containing the description of this gesture (extracted from the gesture repository). Upon receipt of the message, the client browser or local application causes the client to display a request to execute the gesture according to the textual and/or graphical description. Furthermore, one or more processors of the client configure the web-cam drive to capture or record digital video of the usage area. In a particular implementation, the client causes the web-camera to record digital video having a predefined length, such as 5-10 s after a start command has been manually entered into the browser or local application. Furthermore, upon capture of the digital video, the client is configured to transmit the captured video to the server. The access verifier configures one or more microprocessors to receive the recorded digital video, as shown at block 421. The access verifier configures one or more microprocessors to log one or more digital images, defined by sample frames extracted periodically from the digital video (for example, every 0.5-1.5 s) into the image repository as shown at block 424. The access verifier configures one or more microprocessors to determine if the digital video contains an image or representation of the gesture, according to the corresponding rules extracted from the gesture repository (by exploiting standard image recognition techniques) at block 427. The flow of activity branches at block 430 according to a result of this determination. Particularly, if the one of more configured microprocessors have determined that the representation of the gesture has not been found in the digital video, the access verifier module configures one or more microprocessors to implement a failure counter by one in the session handler (initialized to zero at the beginning) at block 433. The one or more microprocessors perform a test at block 436, wherein the access verifier configures one or more microprocessors to verify whether the failure counter meets or exceeds (i.e., it is possibly strictly higher than) the maximum number of access attempts provided by the access policy. If the number of verification attempts has not exceeded the maximum value, the process returns to the block 415 to reiterate the same operations with another (pseudo-random) gesture.

Conversely, as soon as the failure counter exceeds the maximum value, the access verifier module configures one or more microprocessors to deny the user access to the social network service as shown at block 439. For example, the access verifier module configures one or more microprocessors to release a corresponding session handler for the social network. Here, the flow of activity returns to block 403 and the one or more microprocessors wait for a new access request.

In a particular implementation, the use of gesture verification functions as a Completely Automated Public Turing test to tell Computers and Humans Apart (CAPTCHA). Thus, the gesture recognition prevents jamming or redirecting of the web-camera, such as by using third party circumvention software.

Returning to the block 430, the access policy is fulfilled where determination is made by one or more suitably configured microprocessors that the required verification gesture is present within the digital video. In response thereto, the one or more microprocessors are configured to enter into a usage verification cycle as shown at block 442. Here, the usage verifier module configures one or more microprocessors to send a message to the client device causing the image recording device (e.g. web-cam drive) to acquire a (new) digital image of the user area. Furthermore, the client is instructed to transmit the digital image to the server. In a particular implementation, the client device instructs the browser of the client to connect to the server and transmit the digital image. Alternately, a local application configuring the client to communicate with the server transmits the digital image. As soon as the one or more microprocessors configured by the usage verifier module receives the new digital image, the one or more microprocessors log the received image into the image repository at block 445. Continuing to block 448, the usage verifier configures one or more microprocessors to compare the new digital image with the digital images that have been logged previously (during the usage session) into the image repository. For example, the one or more processors implement a standard image comparison techniques to verify whether there is a complete or partial match in content of the new digital image and any one of the logged digital images. The flow of activity branches at block 451 according to a result of this verification.

Particularly, if the one or more processors does not indicate a match has been found, the process descends into block 454. Here, the usage verifier module configures one or more microprocessors to identify the representation of the primary person in the foreground in the digital image. In one implementation, the primary person is identified as the person closest to the client. Continuing to block 457, the usage verifier module configures one or more microprocessors to estimate the age of the main person. Here, the usage verifier module configures one or more microprocessors to apply standard facial recognition techniques based on biometric information of the primary person. Such biometric information may, in a particular implementation, be extracted from the depiction of the person in the digital image (such as by his/her wrinkles). The flow of activity then branches at block 460 depending on the result of a comparison of the age of the main person with the maximum value of the usage policy, as extracted from the corresponding repository.

If the age of the main person does not exceed (i.e., it is not possibly strictly higher than) the maximum value, the process descends into block 463. The usage verifier module configures one or more microprocessors to identify the representation of any secondary persons who are in the background in the digital image. For example, a secondary person may be a person that is farther away from the web-camera or client device, but is still assumed to be accompanying the primary person. The one or more microprocessors implements a secondary person verification processor as indicated at block 466. While the image contains depictions of secondary individuals not verified by the system, the flow of activity descends into block 469. Here, usage verifier module configures one or more microprocessors to estimate the age of a (current) secondary person (in any arbitrary order). Based on the outcome of the comparison, the flow of activity then branches at block 472.

If the age of the one or more secondary persons exceeds the maximum value, the usage verifier module configures one or more microprocessors to verify whether such secondary persons were present in an immediately preceding usage verification cycle (as indicated by a failure flag in the session handler of the user, which is de-asserted at the beginning). If not (failure flag being de-asserted), the usage verifier module configures one or more microprocessors to assert the failure flag at block 478. Returning to the block 472, when the age of the secondary person does not exceed the maximum value of the usage policy, the flow of activity returns to the block 466. With reference again to the block 466, where no secondary person is still to be processed (i.e., no secondary person has been found or all the secondary persons have been processed), the one or more microprocessors determines that the age of any secondary person does not exceed the maximum value. In response thereto, the usage verifier module configures one or more microprocessors to de-assert or otherwise remote the failure flag, as shown at block 481. The process then merges again at block 484 from either the block 478 or the block 481.

At this point, the usage verifier module configures one or more microprocessors to set a repetition delay for a next execution of the usage verification cycle in a pseudo-random way within a predefined interval (for example, from 80-100 s to 120-140 s). At the same time, the usage verifier module further configures one or more microprocessors to permit access to the social network service as soon as the usage policy is completely fulfilled, such as after the first execution of the usage verification cycle with the age of no main/secondary person exceeding the maximum value. The flow of activity then enters a waiting condition at block 487 for the expiration of the repetition delay. Upon expiration of the repetition delay, the microprocessors are suitably configured to repeat the same operations as above (for a next execution of the usage verification cycle). It will be appreciated that such as verification cycle adds a further degree of security, since the pseudo-random delay for the repetition of the usage verification cycle makes it more difficult to jam or redirect the web-cam.

The process descends into block 490 from the block 451 where one or more microprocessors determines that the new digital image matches one of the logged digital images, such that a looping condition has been detected. The process descends from the block 460 where the age of the primary person exceeds the maximum value of the usage policy, such that the main usage rule is not fulfilled. The process descends to block 475 where the age of any secondary person exceeds the maximum value of the usage policy after this has already happened in the immediately preceding usage verification cycle, as indicated by the failure flag being asserted. Thus, according to the secondary usage rule, the usage policy is not fulfilled. Regardless, the flow of activity branches per the status of the usage session. Particularly, if the access to the social network service has not been granted yet (since no execution of the usage verification cycle has been performed with the age of no main/secondary person exceeding the maximum value, as indicated by a corresponding flag in the session handler), the usage verifier module configures one or more microprocessors to deny access to the social network service, as provided at block 493. Conversely, after the one or more microprocessors permit access to the social network service, the usage verifier module configures one or more microprocessors to close the usage session (with the corresponding session handler that is released) as in step 496.

As shown, upon closing of the usage session, the one or more microprocessors are configured to wait for a next request for access as at block 403. Thus, it is appreciated that the verification of the looping condition adds a further degree of security that makes it more difficult to jam or redirect the web-cam. Moreover, the verification of the age of the primary/secondary persons allows promptly interrupting or preventing at all the usage of the social network service by adults. Such interruption applies not only to the primary person in front of the client that is actually using the social network service (as indicated by the main usage condition), but also to any (secondary) person that is close thereto (as indicated by the secondary usage rule). In one or more implementations, the usage guidelines for when the session is closed based on a secondary person may be less stringent than for the primary person. By way of non-limiting example, the secondary person usage rules may permit a person exceeding the prescribed age range to be present as a secondary person without terminating the session as long as the secondary person is present only for a short duration. Here, the secondary usage rule filters out transient situations that may occur during the correct usage of the social network service by age appropriate users, while permitting age in appropriate users (e.g. parents) to come close to them for a short time.

Naturally, in order to satisfy local and specific requirements, a person skilled in the art may apply additional logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling access to a software application. However, the software application may be of any type (for example, a multi-media catalogue, a video streaming service), or a local software application e.g. a local video game. Moreover, the access to the software application may be controlled in any way (for example, to a whole application or to selected functions thereof only) and for any reason. For example, such access control systems may be used to implement a paid or free entertainment system.

In a further implementation, the method includes repeating a usage verification cycle continually during a usage session of the software application. However, the usage verification cycle may be repeated in any way (for example, periodically) during any usage session of the software application (for example, by interrupting it when the software application is idle).

In a further implementation, each repetition of the usage verification cycle includes receiving a digital image of an access area used to access the software application. However, the digital image may be received in any way (for example, in push or pull mode). Moreover, the digital image may represent any access area e.g. a whole room wherein the client is located and it may have been acquired in any way (for example, by external cameras).

In a further implementation, each repetition of the usage verification cycle includes identifying a representation of one or more persons in the digital image. However, the representation of any number of persons (down to a single one) may be identified in any way (for example, with artificial intelligence techniques).

In a particular implementation, each repetition of the usage verification cycle includes configuring one or more microprocessors executing code to estimate an age of each one of the persons according to biometric information of the person extracted from the representation thereof. However, the age (defined in any way, for example, by exact values or by value ranges) may be estimated in any way (for example, with aging process models) according to any biometric information (for example, hairline and eyes).

In a particular implementation, each repetition of the usage verification cycle includes verifying a usage policy based on the age of the persons. However, the usage policy may be of any type (for example, based on the age of a single (main) person, treating all the persons in the same way, for preventing the usage of the software application by persons that are too old or too young) and it may be verified in any way (for example, with fuzzy logic techniques).

In a further implementation, each repetition of the usage verification cycle includes interrupting the usage of the software application in response to a missing fulfillment of the usage policy. However, the missing fulfillment of the usage policy may be defined in any way (for example, when the age of any person exceeds the maximum value in any number of consecutive or non-consecutive usage verification cycles, down to a single one). Moreover, the usage of the software application may be interrupted in any way, even without closing the usage session, such as by freezing the session; but providing additional operations including sending of a warning message to the parents of the user.

In a particular implementation, the method includes executing said receiving a digital image, said identifying a representation, said estimating an age and said verifying a usage policy in response to a request of access to the software application. However, the request of access may be of any type (even without any authentication); in any case, an implementation is not excluded wherein these operations are performed only after the access to the software application has already been granted.

In a one implementation, the method further includes denying the access to the software application in response to the missing fulfillment of the usage policy. However, the access to the software application may be denied in any way (either the same or different with respect to the interruption of its usage, for example, in this case with a more restrictive criterion for the fulfillment of the usage policy).

In a specific implementation embodiment, the method includes executing at least once an access verification cycle in response to the request of access to the software application. However, the access verification cycle may be executed any number of times (down to a single one).

In a particular implementation, each execution of the access verification cycle includes causing an outputting of a request of execution of a pseudo-random gesture. However, the gestures may be in any number and of any type (e.g. stand-up, walk, repeat a phrase, design a figure). Moreover, the corresponding request of execution may be output in any way (e.g. with a voice synthesizer).

In a particular implementation, each execution of the access verification cycle includes receiving a digital video of the access area being acquired in response to the outputting of the request of execution. However, the digital video may be received and acquired in any way (either the same or different with respect to the digital image) and at any time (e.g., by recording it immediately after the request of execution has been output).

In a particular implementation, each execution of the access verification cycle includes verifying a representation of the pseudo-random gesture in the digital video. However, the representation of the pseudo-random gesture may be verified in any way (either the same or different with respect to the representation of the persons).

In a particular implementation, each execution of the access verification cycle includes granting or denying the access to the software application in response to a fulfillment or a missing fulfillment, respectively, of an access policy based on the verification of the representation of the pseudo-random gesture. However, the access policy may be of any type (e.g., tolerating no failure at all) and it may be verified in any way (either the same or different with respect to the usage policy). Moreover, the access to the software application may be granted/denied in any way (either the same or different with respect to above).

In a particular implementation, the fulfillment of the access policy is defined by a positive verification of the representation of the pseudo-random gesture in a single access verification cycle. However, the fulfillment of the access policy may be defined in any other way (e.g., requiring the consecutive or non-consecutive positive verification of two or more gestures).

In a particular implementation, the missing fulfillment of the access policy is defined by a negative verification of the representation of the pseudo-random gesture in a predefined number of a plurality of consecutive access verification cycles. However, the missing fulfillment of the access policy may be defined in any other way (e.g., by any number of consecutive or non-consecutive negative verifications, down to a single one).

In a further implementation, said step of identifying a representation includes identifying the representation of a main one of the persons being in foreground in the digital image. However, the representation of the main person may be identified in any way (e.g., by the largest representation in the digital image).

In a specific implementation, said step of verifying a usage policy includes verifying a main usage rule contributing to the usage policy (with the main usage rule that is based on the age of the main person). However, the main usage rule may contribute to the usage policy in any way (e.g., according to a corresponding weight).

In a further implementation, the missing fulfillment of the usage policy includes a missing fulfillment of the main usage rule, which is defined by the age of the main person exceeding a maximum value in a single usage verification cycle. However, the fulfillment of the main usage rule may be defined in any way (e.g., accepting two or more consecutive or non-consecutive usage verification cycles with the age of the main person exceeding the maximum value).

In a particular implementation, said step of identifying a representation includes identifying the representation of secondary one or more of the persons being in background in the digital image. However, the secondary persons may be in any number (down to a single one) and their representation may be identified in any way (e.g., within a predefined distance from the client).

In a particular implementation, said step of verifying a usage policy includes verifying a secondary usage rule contributing to the usage policy (with the secondary usage rule that is based on the age of each one of the secondary persons). However, the secondary usage rule may contribute to the usage policy in any way (e.g., per one or more corresponding weights, such as decreasing with the distance from the client).

In a particular implementation, the secondary usage rule is more relaxed than the main usage rule. However, this result may be achieved in any way (e.g., by comparing the age of the secondary persons with a higher maximum value); in any case, the possibility is not excluded of having any relation between the main usage rule and the secondary usage rule (even equal to each other).

In a particular implementation, the missing fulfillment of the usage policy includes a missing fulfillment of the secondary usage rule defined by the age of at least one of the secondary persons exceeding the maximum value in a predefined number of a plurality of consecutive usage verification cycles. However, the fulfillment of the secondary usage rule may be defined in any way (e.g., accepting any number of consecutive or non-consecutive usage verification cycles with the age of any number of secondary persons, from a single one to all, exceeding the maximum value, down to none).

In a particular implementation, each repetition of the usage verification cycle includes logging the digital image. However, the digital images may be logged in any way (e.g., in a dedicated memory structure of the session handler of the user). Moreover, the digital images that are logged may be of any type (e.g., the digital images received in the usage verification cycles with or without the addition of any number of digital images extracted from the digital videos).

In a particular implementation, each repetition of the usage verification cycle includes verifying a matching of the digital image with at least one of the previously logged digital images. However, the match may be verified in any way (e.g., after applying motion compensation techniques according to a confidence threshold).

In a particular implementation, each repetition of the usage verification cycle includes interrupting the usage of the software application in response to a looping condition based on the matching of the digital image. However, the looping condition may be defined in any way (e.g., by any number of consecutive or non-consecutive matching) and the usage of the software application may be interrupted in any way (either the same or different with respect to above).

In a particular implementation, each repetition of the usage verification cycle includes setting a pseudo-random repetition delay for a next repetition of the usage verification cycle. However, the pseudo-random delay may be set in any way (e.g., by a pseudo-random delta value for a fixed base value).

In a particular implementation, the software application implements a social network service. However, the social network service may be of any type (e.g., online dating, live help, forum).

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

A particular implementation provides a computer program configured for causing a computing system to perform the above-mentioned method when the computer program is executed on the computing system. A particular implementation provides a computer program product, the computer program product comprising a computer readable storage medium having program instructions embodied therewith, the program instructions being executable by a computing system to cause the computing system to perform the same method. However, the software program may be implemented as a stand-alone module, as a plug-in for a pre-existing software program (e.g., the social manager), or even directly in the latter. Moreover, the software program may run on any computing system (see below). In any case, the solution according to a particular implementation of the present disclosure lends itself to be implemented even with a hardware structure (e.g., by electronic circuits integrated in one or more chips of semiconductor material), or with a combination of software and hardware suitably programmed or otherwise configured.

A particular implementation provides a system comprising means configured for performing each one of the steps of the above-mentioned method. A particular implementation provides a system comprising a circuitry (i.e., any hardware suitably configured, e.g., by software) configured for performing each one of the steps of the same method. However, the system may be of any type (e.g., one or more servers of the social network service or dedicated ones, a client or any combination thereof).

Generally, similar considerations apply if the system has a different structure or includes equivalent components or it has other operative characteristics. In any case, every component thereof may be separated into more elements, or two or more components may be combined together into a single element. Moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, e.g., but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network (e.g., the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider). In some particular implementations, electronic circuitry including, e.g., programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to particular implementations of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various particular implementations of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. E.g., two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing access to a software application using one or more access control processors configured by code executing therein, the method comprising:
   receiving from a client device requesting access to the software application, a digital image, wherein the digital image includes a depiction of the present location of a user of the client device;
   identifying a representation of one or more persons within in the digital image;
   estimating an age of each of the one or more persons within the digital image based on one or more visually identifiable biometric features present within the image;
   comparing the estimated age of each one of the persons within the digital image to a usage policy dataset associated with at least the client device user, wherein the usage policy dataset includes at least a predetermined age threshold value for access to the software application; and
   providing access to the software application based on the comparison of the age of the identified persons with the usage policy dataset.

2. The method according to claim 1, wherein the method further comprises:
   generating an initial request for a digital image of a client device user in response to a user's request to access the software application; and
   transmitting the request to one or more client devices used by the access requesting user.

3. The method according to claim 2, wherein the method further comprises:
   selecting, using a pseudo-random number generator, an entry from a gesture description database;
   including, within the initial request, a request to perform the selected gesture description;
   evaluating the received digital image for a depiction of the selected gesture description; and determining the age of the identified individuals within the digital image where the gesture identified in the received digital image matches the gesture description.

4. The method according to claim 1, wherein the method further comprises:
repeating a usage verification cycle continually upon permitting access to the software application, wherein each repetition of the usage verification cycle includes:
selecting, using a pseudo-random number generator, an entry from a gesture description database;
including, within the initial request, a request to perform the selected gesture description in front of a digital video recorder;
evaluating the received digital video recording for a depiction of the selected gesture description; and
determining the age of the identified individuals within the digital image where the gesture identified in the received digital video matches the gesture description.

5. The method according to claim 4, wherein the method further comprises:
revoking access to the software application where the age of at least one identified person is above the predetermined age threshold value during at least one usage verification cycle.

6. The method according to claim 1, wherein identifying a representation comprises:
identifying the representation of a primary individual within a foreground portion of the digital image.

7. The method according to claim 6, wherein identifying a representation comprises:
identifying the representation of a secondary individual within a background portion of the digital image, and wherein
the usage policy dataset includes:
a first usage rule for the identified primary individual; and
a second usage rule for the identified secondary individual.

8. The method according to claim 7, wherein the first usage rule includes at least one data value corresponding to a permitted age range of the primary individual.

9. The method according to claim 7, further comprising:
comparing the estimated age of the user against the age range data value of the first usage policy; and
revoking access when the identified age of the primary user exceeds the age range data value.

10. The method according to claim 1, wherein the method further comprises:
revoking access to the software application where the age of at least one identified person is above the predetermined age threshold value during at least one usage verification cycle.

11. The method according to claim 10, wherein said the second rule of the usage policy includes:
at least one data value corresponding to a permitted age range of at least one of the secondary individuals.

12. The method according to claim 11, wherein the age value of the secondary usage rule is greater than the age value provided in the usage policy.

13. The method according to claim 11, further comprising revoking access to the software application where the age of at least one secondary person exceeds the permitted age range provided in the second usage rule in a predetermined number of verification cycles.

14. The method according to claim 1, wherein each repetition of the usage verification cycle comprises:
logging the received digital image,
comparing the received digital image with at least one of a previously logged digital image, and
revoking access to the software application in response a failure to match the received digital image and at least one previously logged digital image.

15. The method according to claim 1, wherein each repetition of the usage verification cycle comprises:
setting a pseudo-random repetition delay for a next repetition of the usage verification cycle.

16. The method according to claim 1, wherein the software application is remote to the access control processors.

17. A computer program product, the computer program product comprising a computer readable storage medium having program instructions embodied therewith, the program instructions being executable by a computing system to cause the computing system to perform a method for controlling access to a software application, wherein the method comprises repeating a usage verification cycle continually during a usage session of the software application, each repetition of the usage verification cycle comprising:
receiving a digital image of an access area used to access the software application,
identifying a representation of one or more persons in the digital image based on the image,
estimating an age of each one of the persons according to biometric information of the person extracted from the representation of one or more visually identifiable biometric features present within in the image,
verifying a usage policy based on the age of the persons, and
interrupting the usage of the software application in response to a missing fulfillment of the usage policy.

18. A system for controlling access to a software application, wherein the system comprises:
at least one processor having a memory and being configured with code executing therein to:
repeat a usage verification cycle continually during a usage session of the software application,
receive a digital image of an access area used to access the software application in each repetition of the usage verification cycle,
identify a representation of one or more persons in the digital image in each repetition of the usage verification cycle,
estimate an age of each one of the persons according to biometric information of the person extracted from the representation of one or more visually identifiable biometric features present within in the image in each repetition of the usage verification cycle,
verify a usage policy based on the age of the persons in each repetition of the usage verification cycle, and
interrupt the usage of the software application in response to a missing fulfillment of the usage policy in each repetition of the usage verification cycle.

19. The system according to claim 18, wherein the at least one processor is further configured to:
generate an initial request for a digital image of a user in response to a user's request to access the software application,
transmit the request to one or more client devices used by the access requesting user;
receive from the one or more client devices the digital image;
evaluate the content of the digital image for a representation of the user;
estimate the age of the user based on the image;

compare the estimated age of the user to a usage policy that includes an authorized age range; and deny the access to the software application where the estimated age is outside the authorized age range.

20. The system according to claim 19, wherein the at least one processor is further configured to:

select, using a pseudo-random number generator, an entry from a gesture description database;

include within the initial request the gesture description selected; and evaluate the received digital image for a depiction of the gesture description selected.

\* \* \* \* \*